(12) United States Patent
Wolf et al.

(10) Patent No.: US 8,072,941 B2
(45) Date of Patent: Dec. 6, 2011

(54) METHOD AND APPARATUS OF SYSTEM SCHEDULER

(75) Inventors: Guy Wolf, Petach Tikva (IL); Daniel Yellin, Ra'anana (IL); Ilan Sutskover, Hadera (IL); Yona Perets, Ra'anana (IL); Nadav Shulman, Raanana (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/613,122

(22) Filed: Nov. 5, 2009

(65) Prior Publication Data

US 2010/0046495 A1    Feb. 25, 2010

(51) Int. Cl.
*H04W 4/00* (2009.01)
*H04B 7/26* (2006.01)

(52) U.S. Cl. ......... 370/334; 370/335; 370/337; 370/338

(58) Field of Classification Search .................. 370/337, 370/338, 334, 335
See application file for complete search history.

(56) References Cited

U.S. PATENT DOCUMENTS

| | | | |
|---|---|---|---|
| 6,424,679 B1 * | 7/2002 | Dabak et al. | 375/267 |
| 6,801,788 B1 * | 10/2004 | Csapo et al. | 455/561 |
| 2004/0203419 A1 * | 10/2004 | Crocker et al. | 455/67.11 |
| 2005/0002325 A1 * | 1/2005 | Giannakis et al. | 370/208 |
| 2005/0043031 A1 | 2/2005 | Cho et al. | |
| 2005/0160181 A1 | 7/2005 | Kwon et al. | |

FOREIGN PATENT DOCUMENTS

| | | |
|---|---|---|
| JP | 2002-344415 | 11/2002 |
| KR | 2006-0077800 | 7/2006 |
| WO | WO 02/093819 A1 | 11/2002 |
| WO | WO 03/085875 A1 | 10/2003 |
| WO | 2006/001658 A1 | 1/2006 |

OTHER PUBLICATIONS

Telecom Standards Feb. 2006, vol. 16, No. 2, pp. 1, 4, and 5.*
Office Action of U.S. Appl. No. 12/612,875, dated Jan. 28, 2010.
Final Office Action of U.S. Appl. No. 11/529,726, dated Dec. 2, 2009.
Office Action from U.S. Appl. No. 11/529,726, dated May 12, 2010.
Office Action from U.S. Appl. No. 12/612,875, dated Jul. 21, 2010.
"Technical Specification Group Radio Access Network; Physical Layer Aspects for Evolved UTRA (Release 7)", 3rd Generation Partnership Project, 3GPP TR 25.814 V1.3.2 (May 2006).

(Continued)

*Primary Examiner* — Dwayne Bost
*Assistant Examiner* — Joshua Schwartz
(74) *Attorney, Agent, or Firm* — Shiloh et al.

(57) ABSTRACT

Briefly, according to embodiments of the invention, there is provided a wireless communication system and a method to receive by a base station from a first mobile station a first chain of data symbols transmitted by at least two antennas and having a first transmit diversity, to receive from a second mobile station a second chain of data symbols transmitted by at least two antennas and having a second transmit diversity. Both first and second chains of data symbols are transmitted from the first and second mobile stations at the same time, modulated according to an Orthogonal Frequency Division Multiplexing (OFDM) scheme and encoded by a space time block codes scheme.

4 Claims, 5 Drawing Sheets

OTHER PUBLICATIONS

Siavash M. Alamouti, "A Simple Transmit Diversity Technique for Wireless Communications", IEEE Journal on Select Areas in Communications, vol. 16, No. 8, Oct. 1998.

Rapporteur, "Agreed Text Proposals for the Requirements TR", TSG-RAN meeting No. 27, Agenda Item 9.10.0, Tokyo, Japan Mar. 9-11, 2005.

International Search Report and Written Opinion of PCT/US2007/079465 Mailed Jan. 14, 2008.

Antennas and Propogation for Wireless Communication Systems, by Saunders and Aragon-Zavaal, p. 64 (c) 2007.

Non-Final Office Action from U.S. Appl. No. 11/529,726 mailed on May 1, 2009.

Office Action for Japanese Application No. 2009-530563 mailed on Jun. 28, 2011.

* cited by examiner

METHOD AND APPARATUS OF SYSTEM SCHEDULER

CROSS REFERENCE TO RELATED APPLICATIONS

This application claims priority from prior U.S. application Ser. No. 11/529,726, filed on Sep. 28, 2006 and entitled "METHOD AND APPARATUS OF SYSTEM SCHEDULER", which is incorporated in its entirety herein by reference.

BACKGROUND OF THE INVENTION

Next generation cellular networks (e.g., Long Term Evolution (LTE) cellular systems) may provide higher data rate compared to current and prior wireless technologies. In order to achieve the higher data rate, different multiple input multiple output (MIMO) technologies may be used. In general, MIMO schemes may be characterized by different features. For example, MIMO using diversity schemes (e.g. Alamouti space time block codes, space time trellis\Turbo codes, and etc.) and MIMO using multiplexing schemes.

Diversity schemes limit the over all channel variations in compare to single input single output (SISO) channel and effect the signal to noise (SNR) per link, thus improves the quality of service (QoS) of individual links. In multiplexing schemes the network scheduler assigns users to share substantially the same Time\Frequency (T\F) resources and interference is eliminated by receiver and/or transmitter (Rx\Tx) beam-forming techniques or by interference cancellation\suppression at the receiver. In wireless systems which may operating according to these diversity schemes, a user link may suffer larger variations in signal to noise ratio (SNR) due to rapid variation of an interference. Thus, the QoS per link may be degraded.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
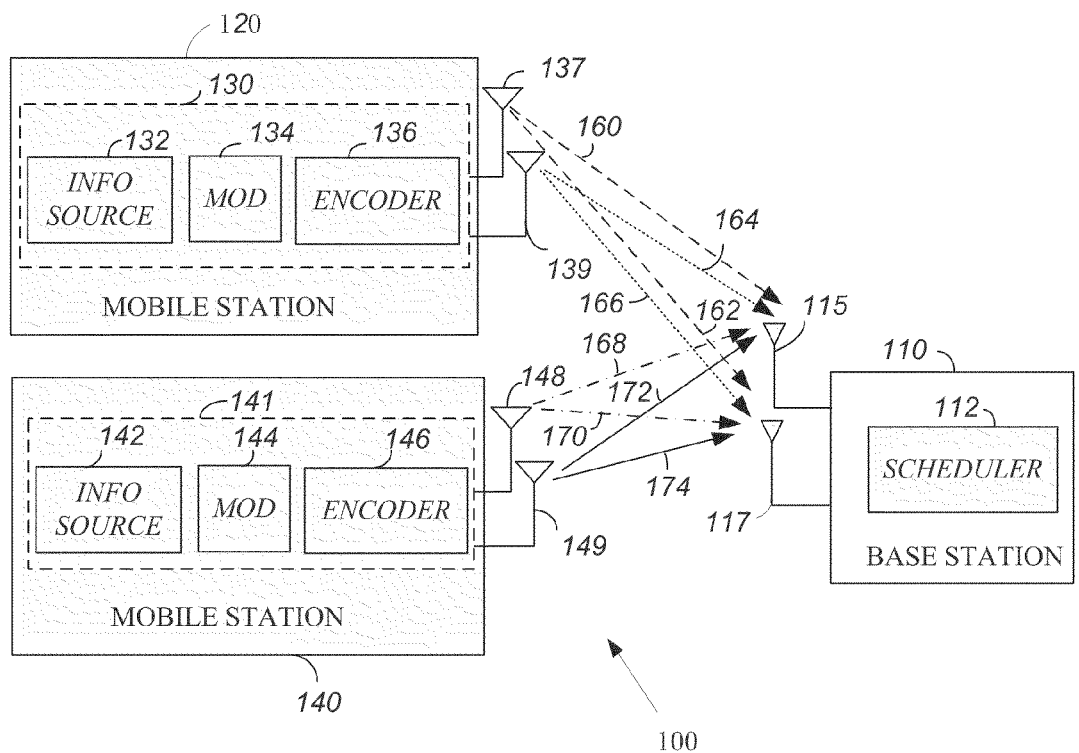
FIG. 1 is a schematic illustration of a wireless communication system according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components, and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing and signal processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as transmitters and/or receivers of a radio system. Transmitters and/or receivers intended to be included within the scope of the present invention may be included, by way of example only, within a wireless local area network (WLAN), two-way radio communication system, digital communication system, analog communication system transmitters, cellular radiotelephone communication system, LTE cellular communication systems, metropolitan wireless local area communication systems (MWLAN) and the like.

Types of cellular radiotelephone communication system intended to be within the scope of the present invention include, although are not limited to, Wideband Code Division Multiple Access (WCDMA), Global System for Mobile communication (GSM), General Packet Radio Service (GPRS), extended GPRS extended data rate for global evolution (EDGE), and the like.

Turning first to FIG. 1, a wireless communication system 100 in accordance with an exemplary embodiment of the invention is shown. Although the scope of the present invention is not limited in this respect, wireless communication system may include at least one base station (BS) 110 and mobile stations 120 and 140, if desired. In this exemplary embodiment of the invention, MS 120 and MS 140 may have a similar structure. Thus, only the structure and operation of one MS (e.g., MS 120) will be described in detail.

According to this exemplary embodiment of the invention, transmitter 130 may include an information (INFO) source 132, a modulator (MOD) 134, an encoder 136 and antennas 137 and 139. MS 140 may include a transmitter 141 and antennas 148 and 149. Transmitter 141 may include an information (INFO) source 142, a modulator (MOD) 144 and an encoder 146. Base Station 110 may include a scheduler 112 and antennas 115 and 117.

Although the scope of the present invention is not limited in this respect, types of antennas that may be used with embodiments of the present invention (e.g., antennas 115, 117, 137, 139, 148 and 149) may include an internal antenna, a dipole antenna, an omni-directional antenna, a monopole antenna, an end fed antenna, a circularly polarized antenna, a microstrip antenna, a diversity antenna and the like.

According to embodiments of the present invention, Space Division Multiple Access (SDMA) scheme may be provided to enable plurality of users, for example MS 120 and 140, to share the substantially the same Time-Frequency resources, if desired. According to the SDMA scheme, scheduler 112 of BS 110 is able to select at least one of the users (e.g., MS 120) suitable for multiplexing. Furthermore, scheduler 112 may assign Time-Frequency resources and power control for the one or more selected user.

According to other embodiment of the present invention, mobile stations 120 and 140 may transmit space time block codes for example, Alamouti space time block codes, according to a predetermined diversity scheme on substantially the same Time-Frequency resources and scheduler 112 may schedule the transmission of substantially the same Time-Frequency resources by both MS 120 and 140, if desired.

According to some exemplary embodiments of the present invention, the transmitter is able to transmit at least two chains of data symbols to provide transmit diversity. For example, the data of the selected user may be encoded by Alamouti space time block code, if desired. The Alamouti space time block code may be preformed over at least two transmit antennas of the at least one selected user (e.g., a mobile station). The at least two Alamouti space time block code instances may be performed in coupled data symbols in time and/or sub-carriers in frequency.

For example, the transmission of the Alamouti space time codes by antennas 137 and 139 of MS 120 may be done at approximately the same time. Antenna 137 may transmit the Alamouti space time codes at a first frequency and antenna 139 may transmit the Alamouti space time codes at a second frequency.

Embodiments of the present invention include a wireless communication system wherein at least one of the first and second mobile stations includes an antenna and the transmission of the space time codes is done using the antenna.

Although the scope of the present invention is not limited in this respect, in some embodiments of the invention, information source may include an application operated by a processor, if desired. For example, the application my generate data bits for transmission. Modulator 134 may modulate the data bits, for example, according to Orthogonal Frequency Division Multiplexing (OFDM) scheme and/or according to a Single Carrier-Frequency Division Multiple Access (SC-FDMA) scheme or the like. Encoder 136 may encode modulated symbols, for example $Z_1$ and $Z_2$ which may be two symbols that designated for Alamoti encoding by space time encoding scheme and/or by space frequency encoding scheme, if desired. Encoder 146 of MS 140 may encode $X_1$ and $X_2$ which may be two symbols that designated for Alamoti encoding, if desired.

According to some exemplary embodiments of the invention, MS 120 may transmit modulated symbols which may be denoted as $Z^1=[Z_1-Z_2^*]$ and $Z^2=[Z_2 Z_1]$ via antennas 137 and 139, respectively, to antennas 115 and 117 of BS 110. Antenna 137 may transmit via a channel 160, which may be denoted as $g_{1,1}$, to antenna 115 of base station 110 and via channel 162, which may be denoted as $g_{2,1}$, to antenna 117 of base station 110. Antenna 139 may transmit modulated symbols, which may be denoted as $Z^2=[Z_2 Z_1]$, via a channel 164, which may be denoted as $g_{1,2}$, to antenna 115 of base station 110 and via channel 166, which may be denoted as $g_{2,2}$, to antenna 117 of base station 110. MS 140 may transmit modulated symbols, which may be denoted as $X^1=[X_1-X_2^*]$ and $X^2=[X_2 X_1]$, via antennas 148 and 149, respectively, to antennas 115 and 117 of BS 110. Antenna 148 may transmit modulated symbols via a channel 168, which may be denoted as $h_{1,1}$, to antenna 115 of base station 110, via channel 170, which may be denoted as $h_{2,1}$, to antenna 117 of base station 110. Antenna 149 may transmit modulated symbols via a channel 172, which may be denoted as $h_{1,2}$, to antenna 115 of base station 110 via channel 174, which may be denoted as $h_{2,2}$, to antenna 117 of base station 110.

Although the scope of the present invention is not limited to this respect, BS 110 may receive a summation of the multiplexed MS 120 and MS 130 signals (passed through the channel media) as depicted in Equation 1.

$$\begin{bmatrix} r_1^j = h_{j,1}X_1 + h_{j,2}X_2 + g_{j,1}Z_1 + g_{j,2}Z_2 + n_1^j \\ r_2^j = -h_{j,1}X_2^* + h_{j,2}X_1^* - g_{j,1}Z_2^* + g_{j,2}Z_1^* + n_2^j \end{bmatrix}. \quad \text{Equation 1}$$

BS 110 may perform Maximal Ratio Combining over the signals received by antennas 115 and 117, followed by 'Alamouti' decoding scheme for the 2 multiplexed users (e.g., MS 120, 140), as shown in Equation 2.

$$\begin{cases} \hat{X}_1 = \sum_{j=1}^{Nrx} [h_{j,1}^* r_1 + h_{j,2} r_2^*] \\ \hat{X}_2 = \sum_{j=1}^{Nrx} [h_{j,2}^* r_1 - h_{j,1} r_2^*] \\ \hat{Z}_1 = \sum_{j=1}^{Nrx} [g_{j,1}^* r_1 + g_{j,2} r_2^*] \\ \hat{Z}_2 = \sum_{j=1}^{Nrx} [g_{j,2}^* r_1 - g_{j,1} r_2^*]. \end{cases} \quad \text{Equation 2}$$

Where, $X_1$, $X_2$ may be the 2 symbols of $User_1$ (e.g., MS 120) designated for Alamouti encoding;

$Z_1$, $Z_2$ may be the 2 symbols of $User_2$ (e.g., MS 140) designated for Alamouti encoding; and $r_1^j$, $r_2^j$ are the received signals at the $j^{th}$ antenna at the base, at the $1^{st}$ and $2^{nd}$ instances of the Alamouti encoding.

Furthermore, BS 110 decode the received signals according to Equation 3 which depicts the BS 110 receiver metric for decoding a subset of 2 symbols of 2 multiplexed users (e.g., MS 120 and MS 140) at each Alamouti block code interval.

$$\begin{cases}
\hat{X}_1 = \sum_{i=1}^{2}\sum_{j=1}^{Nrx}[|h_{j,i}r_1|^2 X_1] + \sum_{j=1}^{Nrx}[h_{j,1}^* n_1^j + h_{j,2}n_2^{j*}] + \\
\quad\quad \sum_{j=1}^{Nrx}[(h_{j,1}^* g_{j,1}^j + h_{j,2}g_{j,2}^{j*})Z_1] + \sum_{j=1}^{Nrx}[(h_{j,1}^* g_{j,2}^j - h_{j,2}g_{j,1}^{j*})Z_2] \\[4pt]
\hat{X}_2 = \sum_{i=1}^{2}\sum_{j=1}^{Nrx}[|h_{j,i}r_1|^2 X_2] + \sum_{j=1}^{Nrx}[h_{j,2}^* n_1^j - h_{j,1}n_2^{j*}] + \\
\quad\quad \sum_{j=1}^{Nrx}[(h_{j,2}^* g_{j,1}^j - h_{j,1}g_{j,2}^{j*})Z_1] + \sum_{j=1}^{Nrx}[(h_{j,2}^* g_{j,2}^j + h_{j,1}g_{j,1}^{j*})Z_2] \\[4pt]
\hat{Z}_1 = \sum_{i=1}^{2}\sum_{j=1}^{Nrx}[|g_{j,i}r_1|^2 Z_1] + \sum_{j=1}^{Nrx}[g_{j,1}^* n_1^j + g_{j,2}n_2^{j*}] + \\
\quad\quad \sum_{j=1}^{Nrx}[(g_{j,1}^* h_{j,1}^j + g_{j,2}h_{j,2}^{j*})X_1] + \sum_{j=1}^{Nrx}[(g_{j,1}^* h_{j,2}^j - g_{j,2}h_{j,1}^{j*})X_2] \\[4pt]
\hat{Z}_2 = \sum_{i=1}^{2}\sum_{j=1}^{Nrx}[|g_{j,i}r_1|^2 Z_2] + \sum_{j=1}^{Nrx}[g_{j,2}^* n_1^j - g_{j,1}n_2^{j*}] + \\
\quad\quad \sum_{j=1}^{Nrx}[(g_{j,2}^* h_{j,1}^j - g_{j,1}h_{j,2}^{j*})X_1] + \sum_{j=1}^{Nrx}[(h_{j,2}^* h_{j,2}^j + g_{j,1}h_{j,1}^{j*})X_2].
\end{cases}$$

Equation 3

Equation 4 depicts a representation of vectors of Equation 3.

$$\alpha = \sum_{i=1}^{2}\sum_{j=1}^{Nrx}[|h_{j,i}r_1|^2]$$

$$\beta = \sum_{i=1}^{2}\sum_{j=1}^{Nrx}[(h_{j,1}^* g_{j,1}^j + h_{j,2}g_{j,2}^{j*})]$$

$$\gamma = \sum_{i=1}^{2}\sum_{j=1}^{Nrx}[(h_{j,1}^* g_{j,2}^j - h_{j,2}g_{j,1}^{j*})]$$

$$\xi = \sum_{i=1}^{2}\sum_{j=1}^{Nrx}[(g_{j,1}^* h_{j,2}^j + g_{j,2}h_{j,2}^{j*})]$$

$$\rho = \sum_{i=1}^{2}\sum_{j=1}^{Nrx}[(g_{j,1}^* h_{j,2}^j - g_{j,2}h_{j,1}^{j*})]$$

$$\delta = \sum_{i=1}^{2}\sum_{j=1}^{Nrx}[|g_{j,i}r_1|^2].$$

Equation 4

Equation 5 depicts the metric of equation 3, as a linear system, for which a solution could be obtained in various known in the art ways.

$$\begin{pmatrix}\hat{X}_1 \\ \hat{X}_2 \\ \hat{Z}_1 \\ \hat{Z}_2\end{pmatrix} = \underbrace{\begin{pmatrix} \alpha & 0 & \beta & \gamma \\ 0 & \alpha & -\gamma^* & \beta^* \\ \xi & \rho & \delta & 0 \\ -\rho^* & \xi^* & 0 & \delta \end{pmatrix}}_{A} \begin{pmatrix}X_1 \\ X_2 \\ Z_1 \\ Z_2\end{pmatrix} + \begin{pmatrix}\tilde{n}_1 \\ \tilde{n}_2 \\ \tilde{n}_3 \\ \tilde{n}4\end{pmatrix}.$$

Equation 5

According to some exemplary embodiments of the present invention, one of the possible solutions may be obtained according to linear Minimum Mean Squared Error (LMMSE) as depicted in Equation 5: $W=(R_{nn}+AA')^{-1}A$ where, W is the linear MMSE and $R_{nn}$ is the noise covariance matrix as depicted in Equation 6 below. Other embodiments of the invention, may involve successive interference cancellation techniques or Zero-Forcing criteria, if desired.

$$R_{nn} = \begin{bmatrix} h'_{1,1} & h'_{2,1} & h_{1,2} & h_{2,2} \\ h'_{1,2} & h'_{2,2} & -h'_{1,1} & -h'_{2,1} \\ g'_{1,1} & g'_{2,1} & g_{1,2} & g_{2,2} \\ g'_{1,2} & g'_{2,2} & -g'_{1,1} & g'_{2,1} \end{bmatrix} *$$

$$\begin{bmatrix} h'_{1,1} & h'_{2,1} & h_{1,2} & h_{2,2} \\ h'_{1,2} & h'_{2,2} & -h'_{1,1} & -h'_{2,1} \\ g'_{1,1} & g'_{2,1} & g_{1,2} & g_{2,2} \\ g'_{1,2} & g'_{2,2} & -g'_{1,1} & g'_{2,1} \end{bmatrix}^H * N_0.$$

Equation 6

Figure 2:
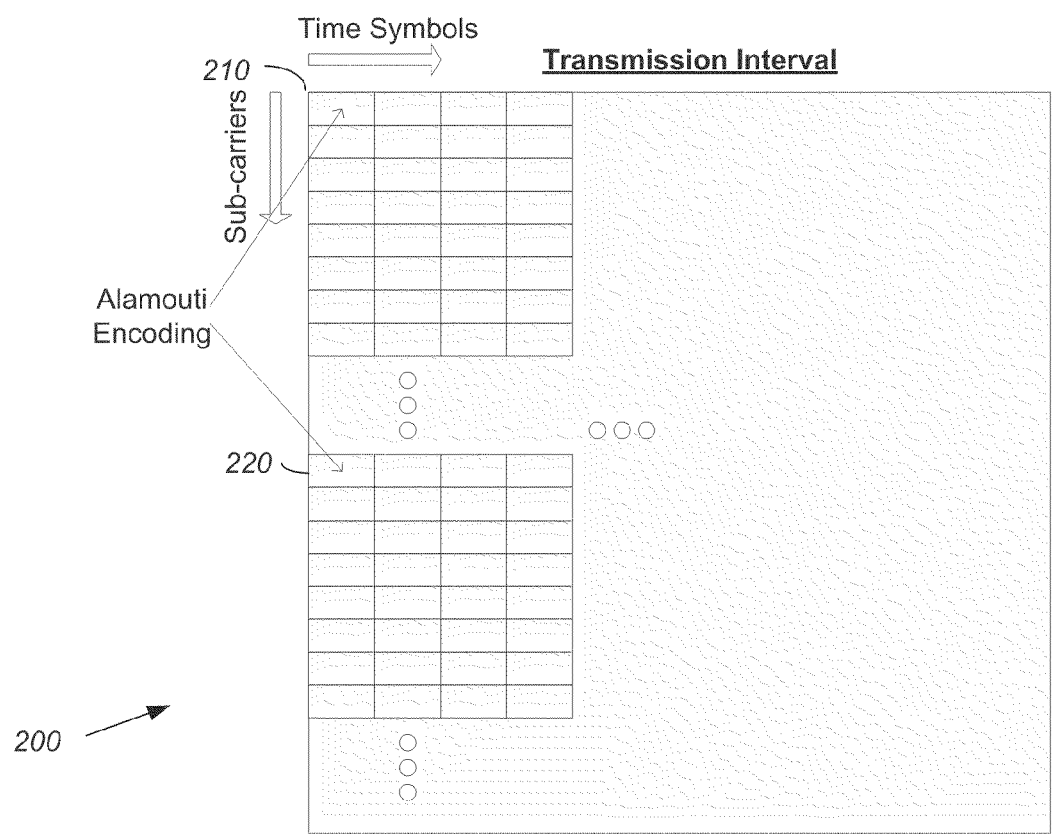
FIG. 2 is a schematic time symbol/frequency slots diagram of a multiplexing scheme in OFDM according to an exemplary embodiment of the invention.

Turning to FIG. 2, a schematic time symbol/frequency slots diagram 200 of a multiplexing scheme in OFDM according to an exemplary embodiment of the invention is shown. Although the scope of the present invention is not limited in this respect, in a presence of multi-path channel, a base station (e.g., BS 110) may direct a mobile station having a single antenna to transmit data symbols according to the Alamouti space time block codes in distinct sub-carriers 210 and 220. For example, the mobile station may transmit the first symbol at frequency 210 and the second symbol at frequency 220. According to some embodiments of the invention, frequencies 210 and 220 may be orthogonal frequencies and the mobile station may transmit the Alamouti time space code by using an orthogonal frequency-division multiplexing transmission scheme, if desired.

Figure 3:
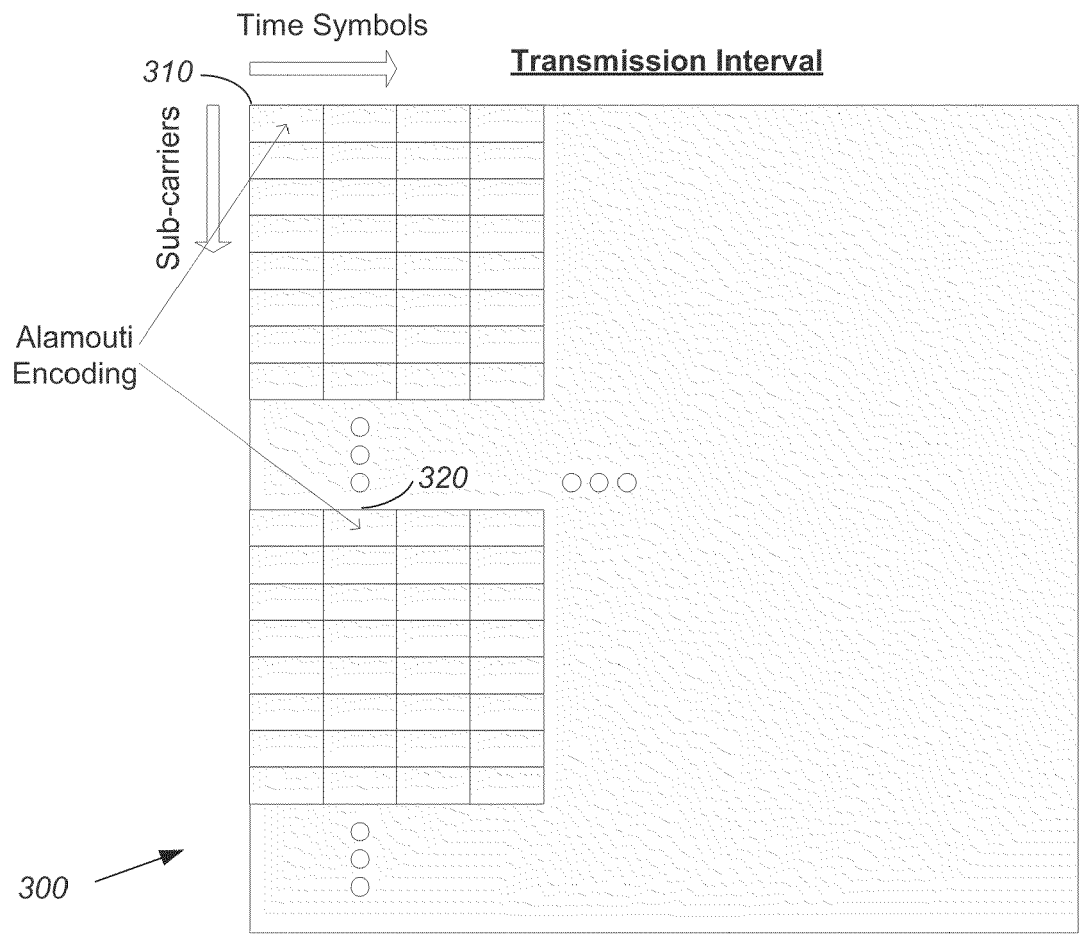
FIG. 3 is a schematic time symbol/frequency slots diagram of a multiplexing scheme in SC-FDMA according to another exemplary embodiment of the invention.

Turning to FIG. 3, a schematic time symbol/frequency slots diagram 300 of a multiplexing scheme in a Single Carrier-Frequency Division Multiple Access (SC-FDMA) according to an exemplary embodiment of the invention is shown. Although the scope of the present invention is not limited in this respect, in a presence of multi-path channel, a base station (e.g., BS 110) may direct a mobile station having a single antenna to transmit data symbols according to the Alamouti space time block codes in distinct and separated in time sub-carriers 310 and 320. For example, the transmission of the Alamouti space time codes using the antenna is done by transmitting a first symbol on sub-carrier frequency 310 and a second symbol at sub-carrier frequency 320.

Figure 4:
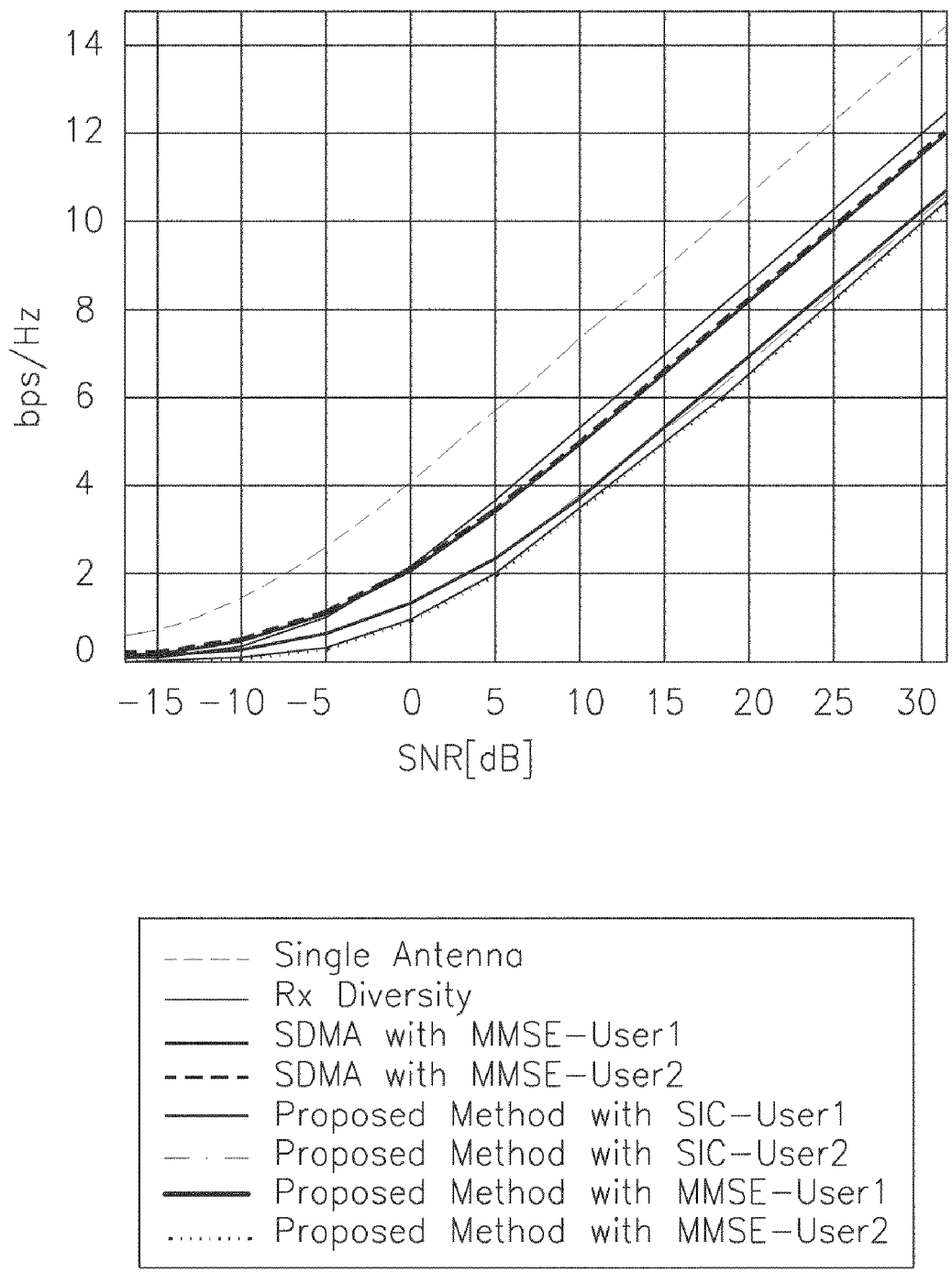
FIGS. 4 and 5 are diagrams helpful to demonstrate a wireless communication system performance according to embodiments of the present invention.
Figure 5:
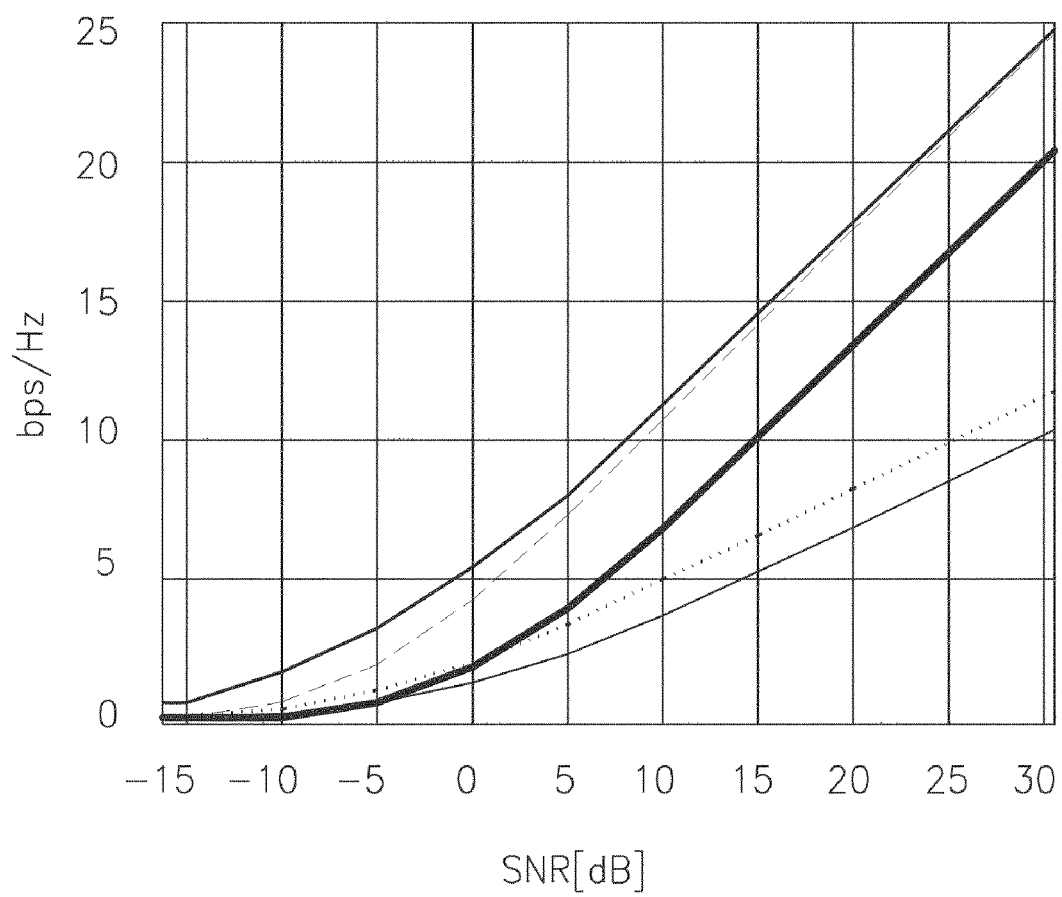
Figure 5:
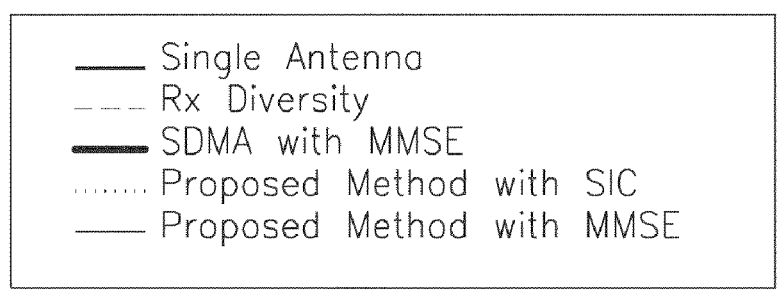

Turning to FIGS. 4 and 5 schematic diagrams of performance of the wireless communication system according to some exemplary embodiments of the invention is shown. Although the scope of the present invention is not limited in this respect, FIGS. 4 and 5 illustrate the potential simulated gains of the multiplexing scheme according to some embodiments of the invention, over diversity scheme and SDMA scheme, in both MMSE solution and Successive Interference Cancellation (SIC) technologies.

For example, FIG. 4 shows two rates of two multiplex user in MMSE and SIC and FIG. 5 shows the overall system rates as the sum of the rates of the two multiplexed users. Both diagrams (e.g., FIGS. 4 and 5) show that the present invention may obtain the diversity gains for individual links and may benefit the large system capacity due to the user multiplexing. The results shown in FIGS. 4 and 5 are for uncorrelated single path channels.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A mobile station configured to operate on a Long Term Evolution (LTE) cellular system comprising:
an antenna; and
a transmitter operably coupled to said antenna, to transmit space time block codes modulated according to a Single Carrier-Frequency Division Multiple Access (SC-FDMA) modulation scheme to a base station of said LTE cellular system, wherein the transmitter transmits data symbols according to the Alamouti space time block codes by assigning each data symbol to a different sub carrier frequency and on substantially the same Time-Frequency resources which are used by another mobile station,
wherein the transmission of the space time codes is done using the antenna,
wherein the transmission of the space time codes using the antenna is done by transmitting a first symbol at a first frequency and a second symbol at a second frequency, and wherein the first frequency includes a first sub-carrier frequency and the second frequency includes a second sub-carrier frequency.

2. The mobile station of claim 1, wherein the space time block codes comprise Alamouti space time block codes.

3. The mobile station of claim 1, comprising at least two antennas.

4. The mobile station of claim 3, wherein the transmission of the space time codes using the at least two antennas is done at a first frequency at a first antenna and a second frequency at a second antenna.

* * * * *

UNITED STATES PATENT AND TRADEMARK OFFICE
CERTIFICATE OF CORRECTION

PATENT NO. : 8,072,941 B2  
APPLICATION NO. : 12/613122  
DATED : December 6, 2011  
INVENTOR(S) : Guy Wolf et al.

It is certified that error appears in the above-identified patent and that said Letters Patent is hereby corrected as shown below:

Title page, below "Prior Publication Data", insert

-- Related U.S. Application Data

(63) Continuation of application No. 11/529,726, filed on Sep. 28, 2006. --.

Signed and Sealed this
Twelfth Day of March, 2013

Teresa Stanek Rea
*Acting Director of the United States Patent and Trademark Office*